UNITED STATES PATENT OFFICE.

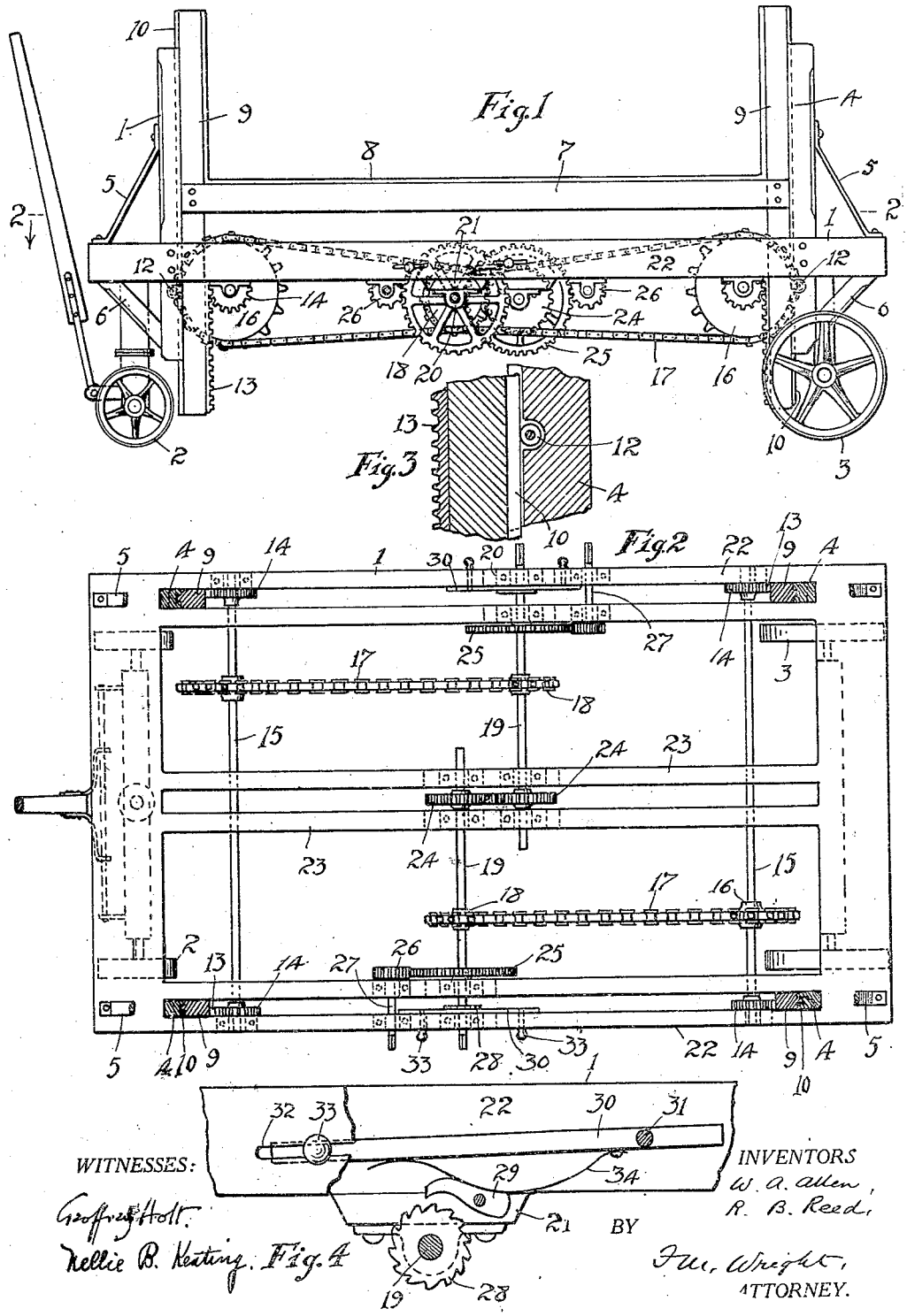

WILLIAM A. ALLEN AND ROBERT B. REED, OF GRANTS PASS, OREGON.

BAGGAGE-TRUCK.

No. 917,985.  Specification of Letters Patent.  Patented April 13, 1909.

Application filed May 2, 1908. Serial No. 430,490.

*To all whom it may concern:*

Be it known that we, WILLIAM A. ALLEN and ROBERT B. REED, citizens of the United States, residing at Grants Pass, in the county of Josephine and State of Oregon, have invented new and useful Improvements in Baggage-Trucks, of which the following is a specification.

The object of the present invention is to provide a truck which will greatly reduce the labor of transferring baggage or heavy articles in general to a car platform or other elevated surface.

In the accompanying drawing, Figure 1 is a side elevation of the truck; Fig. 2 is a horizontal section on the line 2—2 of Fig. 1; Fig. 3 is an enlarged vertical section through one of the slides; Fig. 4 is an enlarged broken side elevation of a detail of the truck.

Referring to the drawing, 1 indicates the frame of a truck mounted upon front wheels 2 and rear wheels 3. Said frame comprises, at the four corners, vertical grooved slideways 4 supported by upper and lower oblique braces 5 and 6.

7 indicates an elevator frame having an elevator platform 8, and at the four corners the vertical slides 9, having tongues 10 which move vertically in the grooves of the slideways 4. Each vertical slide is guided in its lower portion between a pair of longitudinal side beams 22. In recesses in said slideways are rotatably mounted rollers 12 which abut against the edges of the tongues of said slides, and permit said slides to freely move vertically without friction or binding. On the inner sides of said slides are secured vertical racks 13 which mesh with pinions 14 on transverse shafts 15. Upon said shafts 15 are mounted sprocket wheels 16, around which pass sprocket chains 17 which also pass around sprocket wheels 18 upon a transverse operating shaft 19. Each shaft 19 is mounted at its outer end in bearings 20 secured to blocks 21 secured upon the under sides of a pair of longitudinal side beams 22. At its other end the shaft is mounted on bearings secured on blocks similarly mounted on the under sides of a pair of central longitudinal beams 23. Upon said shafts 19, between said beams 23, are secured gear wheels 24 meshing with each other. Thereby said shafts turn in unison but in opposite directions. The directions of motion of the two shafts, however, are such that the four slides 9, at the corners of the elevator platform, rise and fall in unison. In order to turn said shafts in unison to raise or lower the elevator, each short shaft 19 projects through the outer side beam 22 and is square at its end, so that it can be turned by a crank handle. To increase the power, in the case of heavy loads, means are provided comprising a gear wheel 25 on each short shaft 19 meshing with a pinion 26 on a secondary shaft 27, which is likewise extended through the outer side beam 22 and is squared at its end so that it can be engaged by a crank handle.

In order to retain the elevator at any height to which it has been raised, there is secured upon each shaft 19 a ratchet wheel 28, which can be engaged by a pivoted dog 29. Above said dog is a slide piece 30 having secured thereto stems 31 which pass through a slot 32 in the outer side beam 22 and have secured on their outer ends heads 33. To the under side of this slide piece is secured a bow spring 34. In the position shown in Fig. 4, said spring presses upon the rear end of the dog and tends to lift the nose of the dog out of contact with the ratchet wheel, so that the elevator frame is free to descend. But, when said slide is moved to the left, said spring then presses upon the forward part of the dog and forces its nose into contact with the ratchet wheel, so that then, while the shafts 19 can be turned to raise the elevator they cannot be turned backward.

The mode of operation of the apparatus will readily be understood from the foregoing description. The baggage, or other heavy articles, having been loaded on to the elevator platform, the truck is wheeled to the place desired, and the elevator is then raised by turning either a single crank handle applied either to one side or two crank handles applied to opposite sides of the truck. If the load is heavy, the crank handles will be applied to the shafts 27. The elevator platform can thus be raised to the proper level to await the arrival of a train, whereupon the baggage can readily be transferred from the platform to the baggage car. In case heavy baggage is piled up on the truck, the elevator can be raised, after the topmost baggage has been transferred, in order to bring the lower baggage up to the level of the baggage car.

We claim:—

1. In an apparatus of the character described, the combination of a rectangular wheeled truck having guideways at its four corners, an elevator having slides guided vertically by said guideways, racks on said slides, gear wheels engaging said racks, two parallel gear shafts upon which said gear wheels are mounted in pairs, two parallel operating shafts, extending respectively through opposite sides of the truck frame, and provided with means for turning the same by a suitable handle, operative connections between the latter shafts whereby they rotate in unison, and operative connections between said shafts and the gear shafts, substantially as described.

2. In an apparatus of the character described, the combination of a truck frame having guideways, wheels therefor, an elevator frame having vertical slides movable in said guideways, racks on said slides, gear wheels meshing with said racks, an operating shaft constructed to be moved by a suitable handle, a ratchet wheel on said shaft, a spring-actuated dog for engaging said ratchet wheel to prevent the rear movement of the shaft, means for moving the spring to engage the dog either to depress the same to engage the ratchet wheel or to move it therefrom, and an operative connection between said shafts and gear wheels, substantially as described.

3. In an apparatus of the character described, the combination of a truck frame having guideways, wheels therefor, an elevator frame having vertical slides movable in said guideways, racks on said slides, gear wheels meshing with said racks, an operating shaft constructed to be moved by a suitable handle, a ratchet wheel on said shaft, a spring-actuated dog for engaging said ratchet wheel to prevent the rear movement of the shaft, a slidable device upon which said spring is mounted, and means for sliding said device, said spring in one position pressing said dog against said ratchet wheel and in another position raising it therefrom, and an operative connection between said shafts and gear wheels, substantially as described.

4. In an apparatus of the character described, the combination of a truck frame having guideways, wheels therefor, an elevator having slides vertically movable on said guideways, the truck frame having at each side a pair of parallel longitudinal beams, between which beams said slides move vertically, racks on said slides, transverse shafts, gear wheels on said shafts engaging said racks, sprocket wheels on said shafts, transverse operating shafts extending inward from opposite sides of the truck frame, sprocket wheels on said operating shafts, sprocket chains connecting said sprocket wheels with the first named sprocket wheels and gear wheels on said operating shafts meshing with each other, whereby they turn in unison, substantially as described.

In testimony whereof we have hereunto set our hands in the presence of two subscribing witnesses.

WILLIAM A. ALLEN.
ROBERT B. REED.

Witnesses:
H. H. DIXON,
V. A. CLEMENTS.